United States Patent
Chen et al.

(10) Patent No.: US 7,295,261 B2
(45) Date of Patent: Nov. 13, 2007

(54) LIGHT GUIDE PLATE WITH W-SHAPED STRUCTURES AND BACKLIGHT MODULE USING THE SAME

(75) Inventors: Hsin-Ming Chen, Miao-Li (TW); Yu-Ju Hsu, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 11/518,730

(22) Filed: Sep. 11, 2006

(65) Prior Publication Data
US 2007/0058104 A1   Mar. 15, 2007

(30) Foreign Application Priority Data
Sep. 9, 2005  (TW) .............................. 94215517 U

(51) Int. Cl.
G02F 1/1335   (2006.01)
(52) U.S. Cl. .......................................... 349/62; 349/65
(58) Field of Classification Search .................. 349/61, 349/62, 64, 65
See application file for complete search history.

(56) References Cited

U.S. PATENT DOCUMENTS

| 5,771,328 A * | 6/1998 | Wortman et al. ............ 385/146 |
| 6,633,722 B1 | 10/2003 | Kohara |
| 2006/0146227 A1 * | 7/2006 | Park et al. ..................... 349/64 |

* cited by examiner

Primary Examiner—David Nelms
Assistant Examiner—David Chung
(74) Attorney, Agent, or Firm—Wei Te Chung

(57) ABSTRACT

An exemplary light guide plate (31) includes a light incident surface (310), a light output surface (312) adjacent to the light incident surface, and a bottom surface (313) opposite to the light output surface. The bottom surface includes a plurality of W-shaped structures (314) thereat. With such configuration, the output light beams can be concentrated to make the intensity distribution of the output light beams to be even. A backlight module employing the light guide plate is also provided.

8 Claims, 3 Drawing Sheets

LIGHT GUIDE PLATE WITH W-SHAPED STRUCTURES AND BACKLIGHT MODULE USING THE SAME

FIELD OF THE INVENTION

The present invention relates to a light guide plate for use in a liquid crystal display (LCD) or the like, and more particularly to a light guide plate having W-shaped structures at a bottom surface thereof. The invention also relates to a backlight module using the light guide plate.

BACKGROUND

A typical LCD device includes an LCD panel, and a backlight module mounted under the LCD panel for supplying light beams thereto. The backlight module mainly includes a light source and a light guide plate. The light guide plate is generally made of a transparent acrylic plastic, and is used for guiding light beams emitted from the light source in order to uniformly illuminate the LCD panel.

In order to diffuse the light beams and emit them uniformly from a top surface of the light guide plate, it is common for protrusions or recesses to be formed at a bottom surface of the light guide plate. Alternatively, a pattern of light diffusion dots may be formed on the bottom surface of the light guide plate.

Referring to FIG. 7, a conventional backlight module 20 includes a light guide plate 21, a light source 22, and a reflective sheet 23. The light guide plate 21 includes a light incident surface 211, a light output surface 213 adjacent to the light incident surface 211, and a bottom surface 212 opposite to the light output surface 213. The bottom surface 212 includes a plurality of parallel, regularly arranged V-shaped prisms 214. The light source 22 is disposed adjacent to the light incident surface 211, and the reflective sheet 23 is disposed adjacent to the bottom surface 212.

Referring to FIG. 8, an exemplary optical path of a light beam transmitting in the backlight module 20 is shown. Light beams emitted by the light source 22 propagate within the light guide plate 21, are reflected and refracted by the light guide plate 21 and the reflective sheet 23, and exit from the output surface 213 to illuminate an associated liquid crystal display panel.

Also referring to FIG. 9, this shows a light intensity distribution graph of light beams output from the light guide plate 21. In the graph, X, Y coordinate values are plotted. An angle between light beams output from the output surface 213 and a line normal to the output surface 213 is taken as a value of the X-coordinate, and a relative intensity of the light beams is taken as a value of the Y-coordinate. The curve A1 denotes a relative intensity of the light beams in a first plane perpendicular to both the light output surface 213 and the light incident surface 211. The curve B1 denotes a relative intensity of the light beams in a second plane that maintains an angle of 45° relative to the first plane. The curve C1 denotes a relative intensity of the light beams in a third plane that maintains an angle of 90° relative to the first plane. The curve D1 denotes a relative intensity of the light beams in a fourth plane that maintains an angle of 135° relative to the first plane. According to FIG. 9, the V-shaped prisms 214 at the bottom surface 212 tend to concentrate the emitting angles of the output light beams.

The intensity of the output light beams located in the range of ±20° in each of the first, second, and fourth planes is greatest, and approaches a maximum value of 7. On the other hand, the intensity of the output light beams located in the range of ±20° in the third plane is low. Even the maximum value achieved at the angle of 0° is low—i.e. approximately 2 only. That is, with the configuration of the V-shaped prisms 214, the output light beams cannot be satisfactorily concentrated in the third plane that is perpendicular to the light output surface 213 and parallel to the light incident surface 211. In other words, the overall intensity distribution of the output light beams is not even.

Accordingly, what is needed is a light guide plate and a backlight module that can overcome the above-described deficiencies.

SUMMARY

A light guide plate includes a light incident surface, a light output surface adjacent to the light incident surface, and a bottom surface opposite to the light output surface. The bottom surface includes a plurality of W-shaped structures thereat.

A backlight module includes a light guide plate and a light source. The light guide plate includes a light incident surface, a light output surface adjacent to the light incident surface, and a bottom surface opposite to the light output surface. The light source is disposed adjacent to the light incident surface of the light guide plate. The bottom surface includes a plurality of W-shaped structures thereat.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
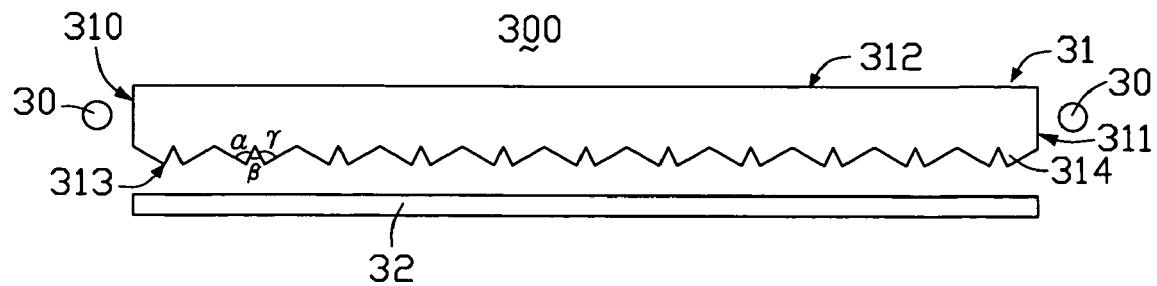
FIG. 1 is an exploded, side view of a backlight module according to a first embodiment of the present invention, the backlight module including a light guide plate, a reflective sheet, and two light sources, the light guide plate defining a plurality of W-shaped structures.

Referring to FIG. 1, a backlight module 300 according to a first embodiment of the present invention includes two light sources 30, a light guide plate 31, and a reflective sheet 32. The light sources 30 may be cold cathode fluorescent lamps.

The light guide plate 31 includes two light incident surfaces 310 and 311, a light output surface 312 adjacent to both the light incident surfaces 310 and 311, and a bottom surface 313 opposite to the light output surface 312.

The bottom surface 313 includes a plurality of generally W-shaped structures 314 thereat. In the illustrated embodiment, the W-shaped structures 314 are a plurality of rectilinear protrusions, each having a W-shaped profile. Each of the W-shaped structures 314 spans from one lateral side of the light guide plate 31 to an opposite lateral side of the light guide plate 31. All the W-shaped structures 314 have a same height and a same shape, are parallel to the light incident surfaces 310 and 311, and are continuously arranged one beside the other. Each of the W-shaped structures 314 has two generally symmetrically opposite elongate prisms (not labeled). Each prism includes a pair of flat surfaces (not labeled), and spans between the opposite lateral sides of the light guide plate 31. In each W-shaped structure 314, one of the prisms forms an apex angle $\alpha$, and the other prism forms an apex angle $\gamma$. The angle $\alpha$ and angle $\gamma$ are each greater than an angle $\beta$ formed between the two prisms. In the illustrated embodiment, the angle $\alpha$ and angle $\gamma$ are equal to each other. In alternative embodiments, the angle $\alpha$ and angle $\gamma$ can be different from each other. The W-shaped structures 314 may be formed at the bottom surface 313 by molding or by a cutting method.

The light sources 30 are disposed adjacent to the light incident surfaces 310 and 311 respectively, and the reflective sheet 32 is disposed immediately below the bottom surface 313.

Figure 2:
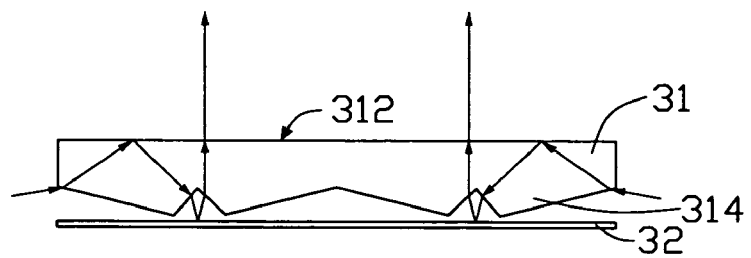
FIG. 2 is essentially an enlarged view of part of the light guide plate and reflective sheet of FIG. 1, showing essential optical paths thereof.

Also referring to FIG. 2, this shows essential optical paths of light beams transmitting in the backlight module 300. Light beams emitted by the light sources 30 propagate within the light guide plate 31, are reflected and refracted at the W-shaped structures 314 and the reflective sheet 32, and subsequently exit from the light output surface 312 of the light guide plate 31. The W-shaped structures 314 are used to evenly concentrate the emitting angles of the output light beams, particularly in directions generally perpendicular to the light output surface 312.

Figure 3:
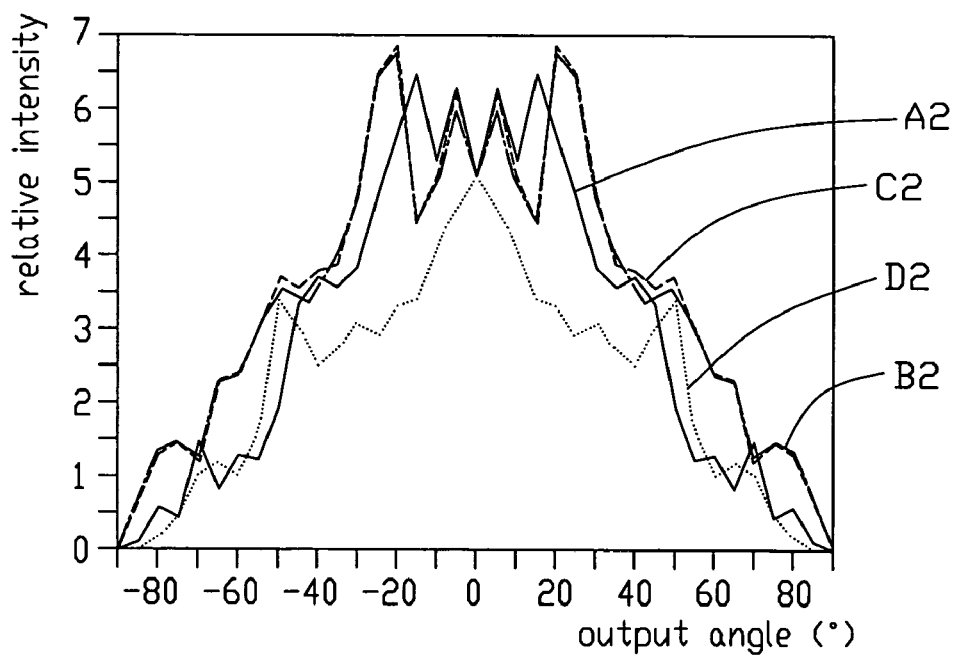
FIG. 3 is a graph showing light intensity distribution of light beams output from the backlight module of FIG. 1.

Referring to FIG. 3, this shows a light intensity distribution graph of light beams output from the light guide plate 31. In the graph, X, Y coordinate values are plotted. An angle between light beams output from the output surface 312 and a line normal to the output surface 312 is taken as a value of the X-coordinate, and a relative intensity of the light beams is taken as a value of the Y-coordinate. The curve A2 denotes a relative intensity of the light beams in a first plane perpendicular to both the light output surface 312 and the light incident surface 311. The curve B2 denotes a relative intensity of the light beams in a second plane that maintains an angle of 45° relative to the first plane. The curve C2 denotes a relative intensity of the light beams in a third plane that maintains an angle of 90° relative to the first plane. The curve D2 denotes a relative intensity of the light beams in a fourth plane that maintain an angle of 135° relative to the first plane. According to FIG. 3, the W-shaped structures 314 at the bottom surface 313 tend to concentrate the emitting angles of the output light beams.

The intensity of the output light beams located in the range of ±20° in each of the first, second, and third planes is greatest, and approaches a maximum value of 7. The intensity of the output light beams located in the range of ±20° in the fourth plane is less, and approaches a value of 5. Unlike with the conventional backlight module 20, the W-shaped structures 314 of the light guide plate 31 provide relative uniformity of output light beams across all of the first, second, third and fourth planes that are perpendicular to the light output surface 312. That is, an overall intensity distribution of the output light beams is relatively even.

Figure 4:
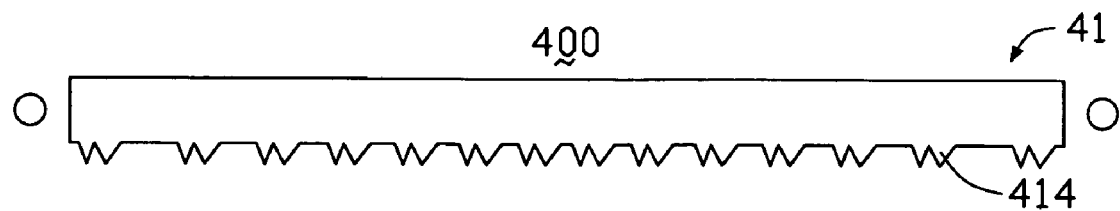
FIG. 4 is a side view of a backlight module according to a second embodiment of the present invention.

Referring to FIG. 4, a backlight module 400 according to a second embodiment of the present invention has a structure similar to that of the backlight module 300 of the first embodiment. The backlight module 400 includes a light guide plate 41, and a pair of light sources (not labeled) at two opposite ends of the light guide plate 41 respectively. The light guide plate 41 includes a plurality of W-shaped structures 414 at a bottom surface thereof. In the illustrated embodiment, the W-shaped structures 414 are a plurality of rectilinear protrusions, each having a W-shaped profile. All of the W-shaped structures 414 are spaced apart from each other various distances, and are symmetrically distributed at two opposite sides of a transverse centerline (not shown) of the bottom surface of the light guide plate 41. That is, a density of distribution of the W-shaped structures 414 progressively increases along a direction from each end of the light guide plate 41 to the centerline of the bottom surface of the light guide plate 41. Each of the W-shaped structures 414 has two elongate prisms (not labeled) which are shaped differently from each other. Each prism includes a pair of flat surfaces (not labeled), and spans between two opposite lateral sides of the light guide plate 41. The angles of the prisms of each of the W-shaped structures 414 may be configured to enable all the W-shaped structures 414 to have varying shapes. The arrangement of the W-shaped structures 514 helps ensure that an intensity of output light beams over a whole of a light output surface (not labeled) of the light guide plate 41 is uniform. That is, an overall intensity distribution of the output light beams is relatively even.

Figure 5:
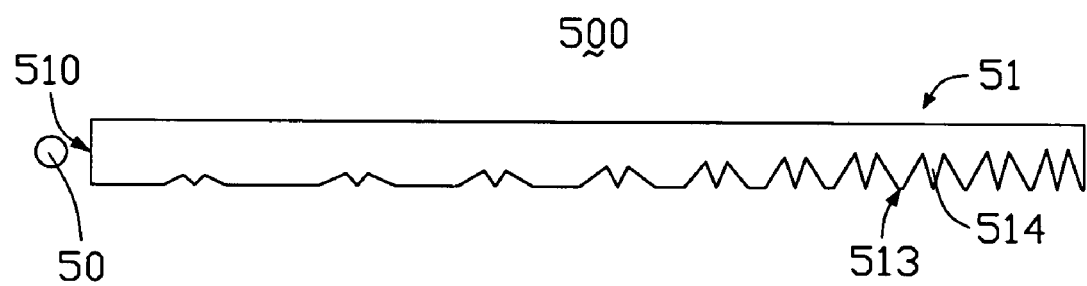
FIG. 5 is a side view of a backlight module according to a third embodiment of the present invention.

Referring to FIG. 5, a backlight module 500 according to a third embodiment of the present invention is shown. The backlight module 500 has a structure similar to that of the backlight module 300 of the first embodiment. However, the backlight module 500 includes a single light source 50 and a light guide plate 51. The light guide plate 51 includes a light incident surface 510, and a bottom surface 513 adjacent to the light incident surface 510. The bottom surface 513 includes a plurality of W-shaped structures 514 thereat. In the illustrated embodiment, the W-shaped structures 514 include a plurality of portions of the light guide plate 51 having grooves defined therein. Each W-shaped structure 514 includes a pair of grooves that provide the W-shaped structure 514 with a W-shaped profile. The W-shaped structures 514 are spaced apart from each other various distances. In particular, a density of the W-shaped structures 514 progressively increases along a direction away from the light incident surface 510. Further, heights of the W-shaped structures 514 progressively increase along the direction away from the light incident surface 510. The arrangement and varying configurations of the W-shaped structures 514 help ensure that an intensity of output light beams over a whole of a light output surface (not labeled) of the light guide plate 51 is uniform. That is, an overall intensity distribution of the output light beams is relatively even.

Figure 6:
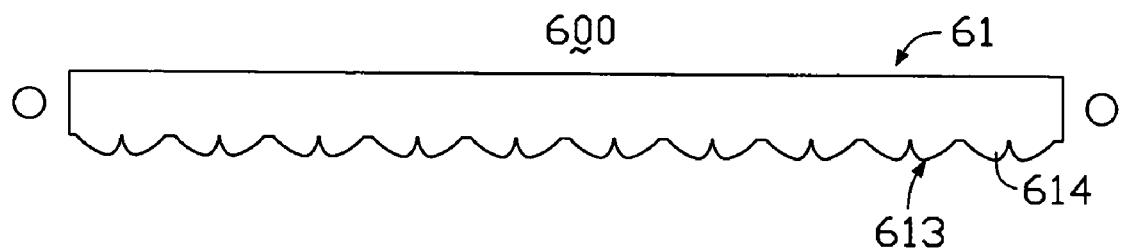
FIG. 6 is a side view of a backlight module according to a fourth embodiment of the present invention.
Figure 7:
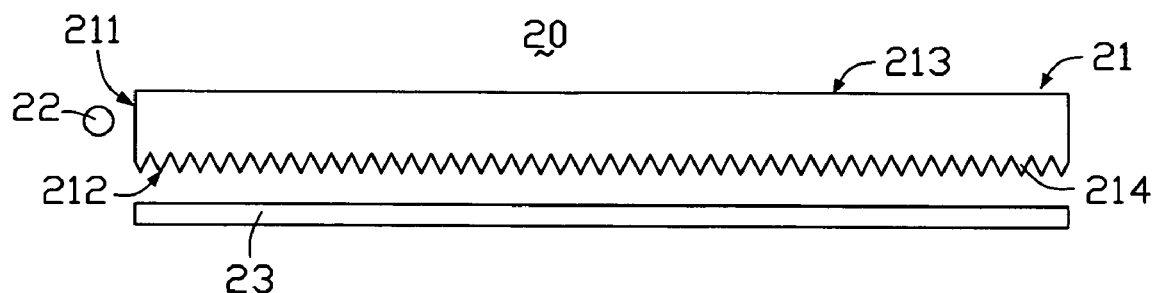
FIG. 7 is an exploded, side view of a conventional backlight module, the backlight module including a light guide plate, a reflective sheet, and a light source.
Figure 8:
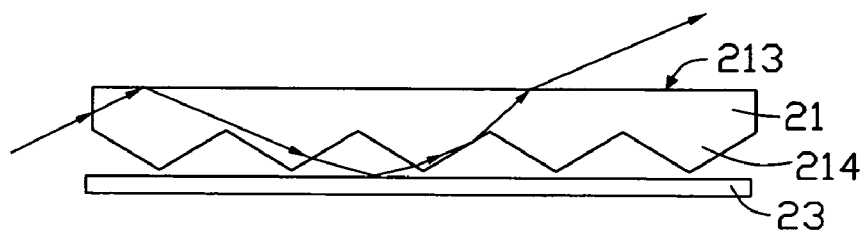
FIG. 8 is essentially an enlarged view of part of the light guide plate and reflective sheet of FIG. 7, showing essential optical paths thereof.
Figure 9:
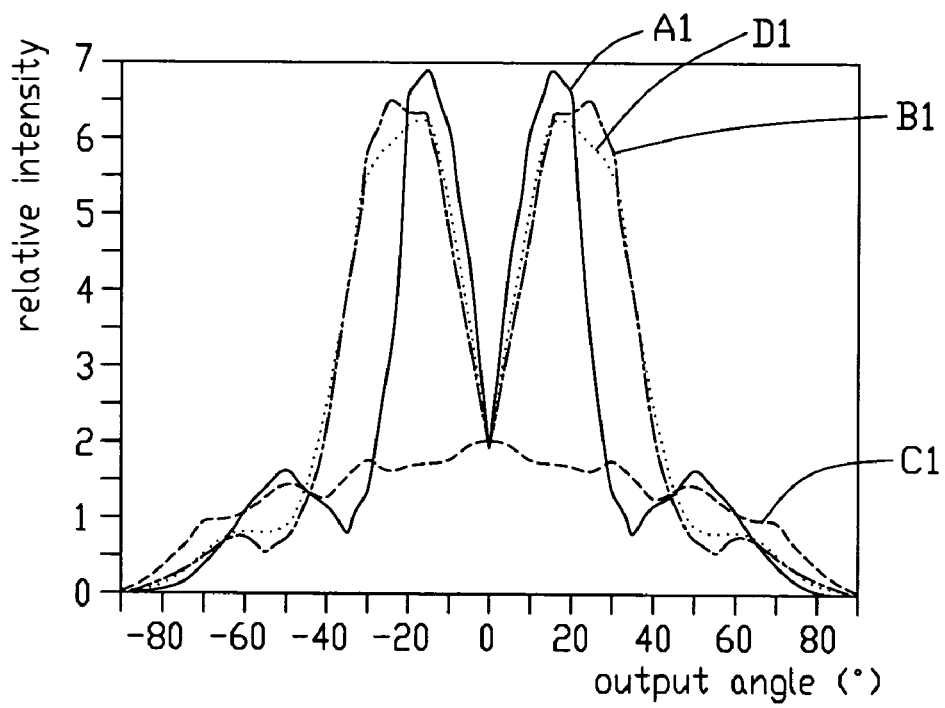
FIG. 9 is a graph showing light intensity distribution of light beams output from the backlight module of FIG. 7.

FIG. 6 shows a backlight module according to a fourth embodiment of the present of the present invention. The backlight module 600 has a structure similar to that of the backlight module 300 of the first embodiment. However, the backlight module 600 includes a plurality of W-shaped structures 614 at a bottom surface of a light guide plate 61. Each of the W-shaped structures 614 has two generally symmetrically opposite elongate prisms (not labeled). Each prism has a pair of curved surfaces (not labeled), and spans between opposite lateral sides of the light guide plate 61. In the illustrated embodiment, the prisms in each W-shaped structure 614 have a same shape but are symmetrically opposite from each other. In an alternative embodiment, the prisms in each W-shaped structure 614 can be different from each other. In another alternative embodiment, the W-shaped structures 614 can be spaced apart from each other. The backlight module 600 has advantages similar to those described above in relation to the backlight module 300 of the first embodiment.

Various modifications and alterations are possible within the ambit of the invention herein. For example, the W-shaped structures may be other kinds of protrusions or grooves or a combination of protrusions and grooves. The protrusions and/or grooves may be continuously arranged, or alternately arranged. With these configurations, the backlight module may provide substantially uniform intensity of output light beams. That is, an overall intensity distribution of the output light beams is relatively even.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate, comprising:
    a light incident surface;
    a light output surface adjacent to the light incident surface; and
    a bottom surface opposite to the light output surface, the bottom surface defining a plurality of W-shaped structures thereat;
    wherein each of the W-shaped structures comprises two generally symmetrically opposite but not identical elongate prisms, and each prism comprises a pair of curved surfaces, and spans between opposite lateral sides of the light guide plate.

2. A light guide plate, comprising:
    a light incident surface;
    a light output surface adjacent to the light incident surface; and
    a bottom surface opposite to the light output surface, the bottom surface defining a plurality of W-shaped structures thereat;
    wherein each of the W-shape structures comprises two generally symmetrically opposite elongate prisms, each prism comprises a pair of flat surfaces, and spans between opposite lateral sides of the light guide plate;
    wherein in each W-shaped structure, one of the prisms forms a first apex angle, and the other prism forms a second apex angle, and the first and second apex angles are each greater than an angle formed between two prisms.

3. The light guide plate as claimed in claim 2, wherein the first angle and the second angle are equal to each other.

4. The light guide plate as claimed in claim 2, wherein the first angle and the second angle are different from each other.

5. The light guide plate as claimed in claim 2, wherein the light incident surface is located at one end of the light guide plate, and the W-shaped structures are spaced apart from each other various distances, and are symmetrically distributed at two opposite sides of an imaginary transverse centerline of the bottom surface of the light guide plate.

6. The light guide plate as claimed in claim 5, wherein a density of distribution of the W-shaped structures progressively increases along a first direction from said one end of the light guide plate to the imaginary centerline of the bottom surface of the light guide plate, and progressively increases along a second direction from an opposite end of the light guide plate to the imaginary centerline of the bottom surface of the light guide plate, the second direction being opposite to the first direction.

7. A light guide plate, comprising:
    a light incident surface;
    a light output surface adjacent to the light incident surface; and
    a bottom surface opposite to the light output surface, the bottom surface defining a plurality of W-shaped structures thereat;
    wherein each W-shaped structure comprises a pair of grooves that provide the W-shaped structure with a W-shaped profile, the W-shaped structures are spaced apart from each other various distances, and a density of the W-shaped structures increases along a direction away from the light incident surface of the light guide plate.

8. The light guide plate as claimed in claim 7, wherein a height of the W-shaped structures increases along a direction away from the light incident surface of the light guide plate.

* * * * *